Patented May 6, 1930

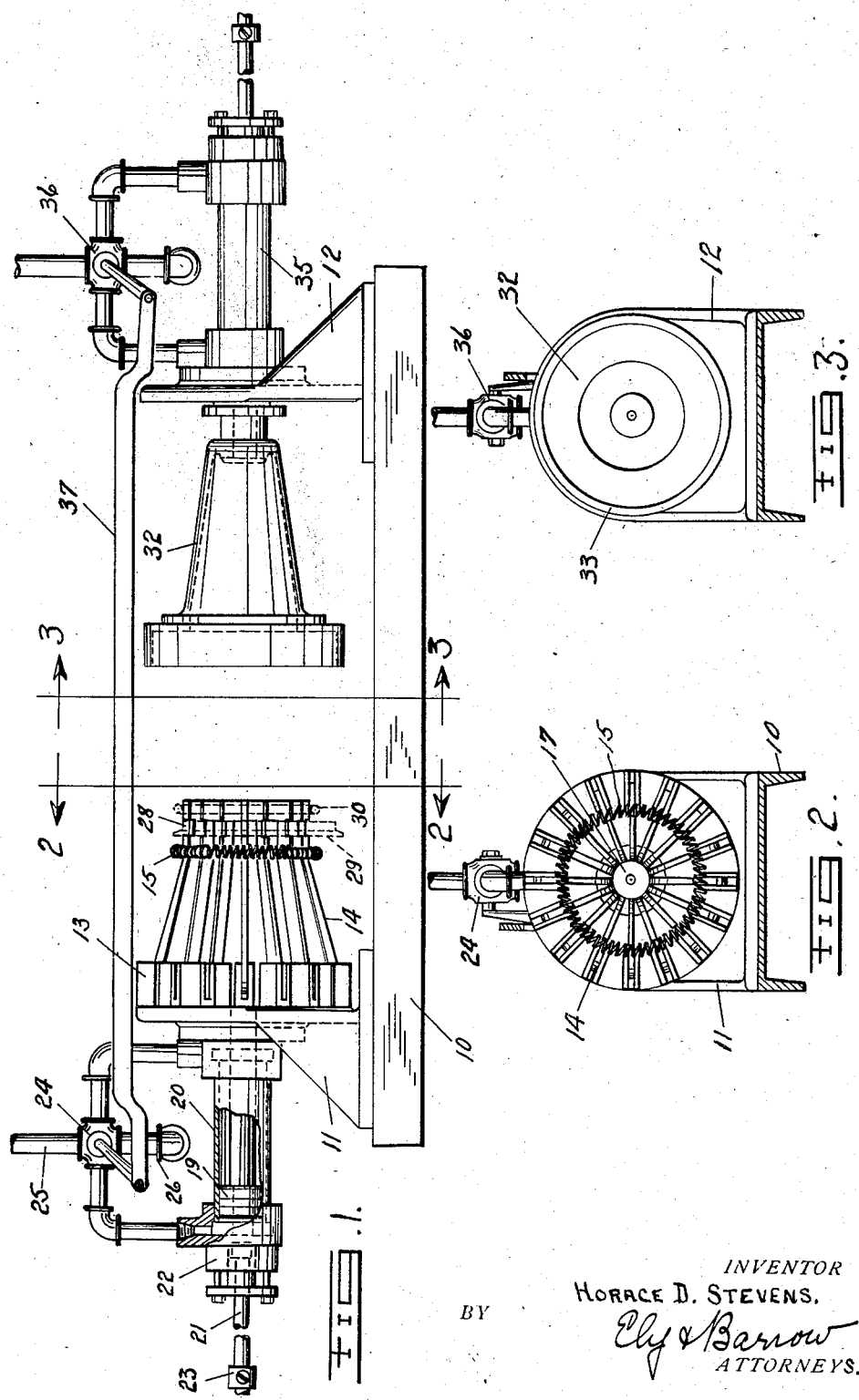

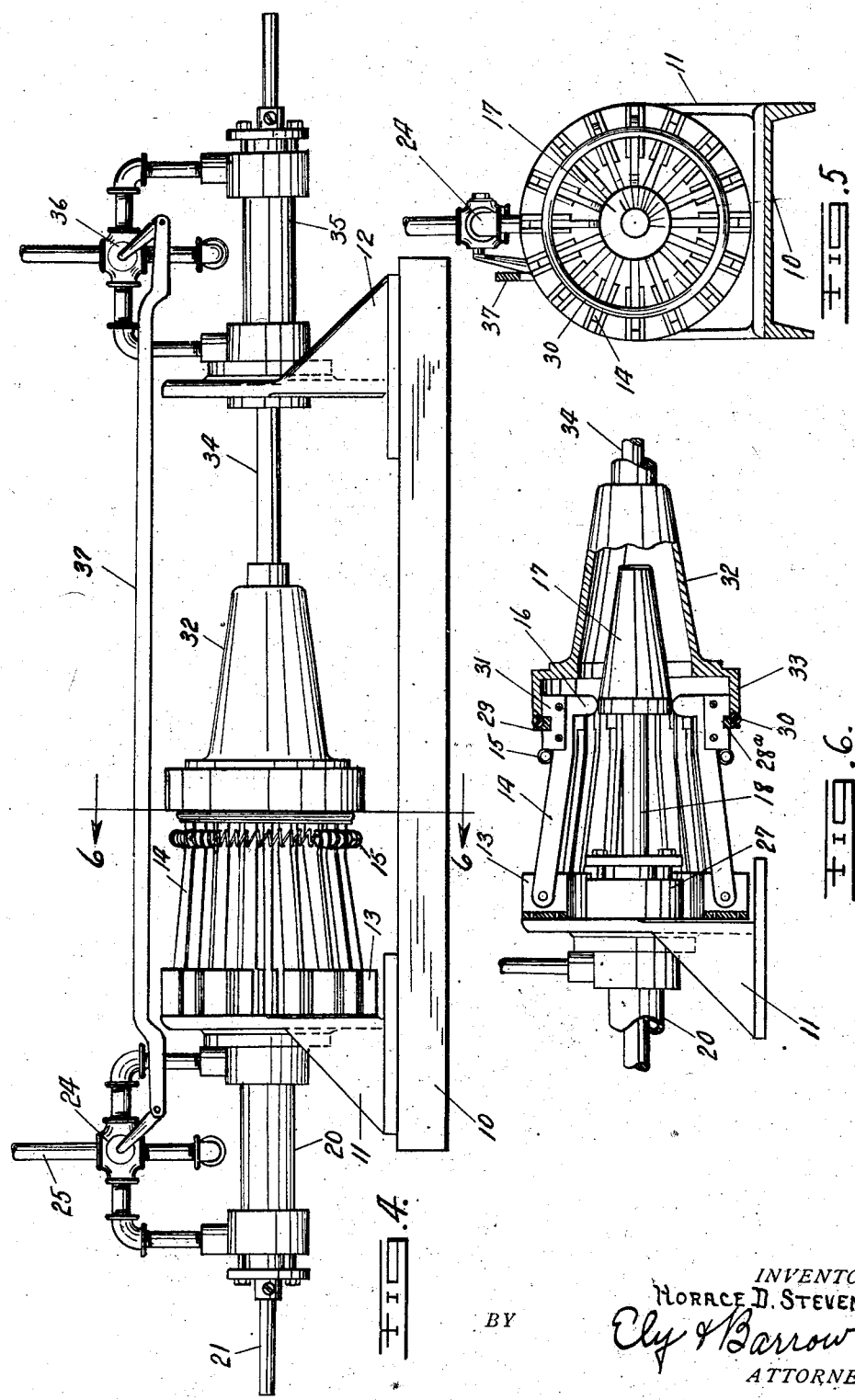

1,757,750

UNITED STATES PATENT OFFICE

HORACE D. STEVENS, OF AKRON, OHIO, ASSIGNOR TO THE FIRESTONE TIRE & RUBBER COMPANY, OF AKRON, OHIO, A CORPORATION OF OHIO

EXPANDING MACHINE

Application filed June 20, 1928. Serial No. 287,031.

This invention relates to expanding machines and has particular reference to apparatus for expanding annular bands, belts or grommets of reinforced rubber or of rubberized fabic, and for forcing the bands in their expanded condition onto forms to maintain the articles under tension during a subsequent molding operation.

In the manufacture of endless bands or grommets such as, for instance, rubberized fabric power transmission belts, it is highly desirable to eliminate from the belt tendency towards elongation. One means for preventing elongation is by expanding such belts during the process of manufacture to take up as much of the stretch of the material as practicable. An object of the present invention, therefore, is to devise apparatus for expanding endless belts or bands of rubberized fabric or of rubber reinforced with cords or fabric, before they are vulcanized or molded to final form. A further object is to provide means for transferring said belts or bands to a mold ring or form to maintain the same under tension during the vulcanizing process. Another object is to devise means for stretching endless bands and for placing said bands in stretched condition upon forms for vulcanization whereby the tendency towards elongation in the finished product will be substantially eliminated.

The foregoing and other objects are obtained by the construction illustrated in the accompanying drawings and described below. It will be understood that the invention is not limited to the specific form thereof disclosed herein.

Of the accompanying drawings,

Figure 1 is a side elevation of apparatus embodying the principles of the invention;

Figure 2 is an end elevational section taken on the line 2—2 of Figure 1;

Figure 3 is an end elevational section taken on the line 3—3 of Figure 1;

Figure 4 is a side elevation of the apparatus in operative position for expanding and positioning an article on a vulcanizing form;

Figure 5 is an end elevational section thereof taken on the line 6—6 of Figure 4; and Figure 6 is a detailed view of a slightly modified form thereof partly in longitudinal section.

Referring to the drawings, the numeral 10 denotes a table or base upon which are mounted standards 11 and 12 for respectively supporting apparatus for expanding endless articles in annular form, and apparatus for forcing said articles onto vulcanizing forms while maintained in expanded condition by said expanding apparatus. A series of bracket members 13 are arranged circularly about one side of standard 11 and have pivoted thereto a series of arms 14, the free ends of which are drawn radially inwardly by an annular spring or resilient band 15. Said free ends of arms 14 terminate in inwardly directed extensions 16 adapted to engage a cone-shaped reciprocable cam 17 mounted on piston rod 18 actuated by piston 19 reciprocable in cylinder 20 mounted on the other side of standard 11.

An extension 21 on piston rod 18 projects beyond the outer end of the cylinder through a stuffing box and bearing 22 and is provided with a stop member 23 for limiting the outward stroke of cam 17. Cylinder 20 is double acting and is operated by fluid pressure controlled by a four-way valve 24 connecting one end of the cylinder with supply line 25 and the other end of the cylinder with exhaust line 26 and vice versa as the valve is reversed. The inner end of the cylinder is provided with a stuffing box and bearing 27. Each of arms 14 is provided with a notch 28 adapted to support an annular form 29 for receiving an endless band 30 after the latter has been expanded. In case bands of larger diameter are to be expanded on the device, adapters 31 may be attached to arms 14, said adapters consisting merely of blocks formed with notches 28ª for holding the corresponding larger sized vulcanizing form, as shown in Figure 6.

The means for forcing the expanded band or belt 30 onto vulcanizing form 29 comprises a cup-shaped head 32 terminating in a circumferential flange 33 which is proportioned to clear the ends of arms 14 when the latter are in expanded condition. When adapters 31 are used it will be understood that a head with a larger flange will be employed in order to clear said adapters. Head 32 is reciprocable from a retracted position as shown in Figure 1 to a position partially surrounding the ends of arms 14 as shown in Figure 4 and is mounted on a piston rod 34 actuated by a fluid pressure operated double acting cylinder 35 similar to cylinder 20 and controlled by a four-way valve 36. A connecting link 37 may be attached to valves 24 and 36 for simultaneous operation thereof so that as expander reaches the limit of its radial outward motion flange 33 will telescope over the ends of arms 14 thereof.

In the operation of the device a vulcanizing form 29 is supported in notches 28 and the rubberized fabric or cord reinforced belt 30 is placed upon the free ends of arms 14 as indicated by the dotted lines in Figure 1. Valve 24 is then operated to reciprocate cam 17 for forcing the ends of arms 14 radially outwardly to expand belt 30. Form 29 will then be rigidly held in all of the notches 28, its size being so proportioned that when belt 30 is expanded and placed thereon, substantially all of the elongation of the belt will be taken up. Meanwhile head 32 has been reciprocated by the operation of the valve 36 to telescope flange 33 over the ends of arms 14 for pushing or rolling belt 30 onto form 29 as shown in Figure 4. Valves 36 and 24 are then again operated to retract the head 32 and contract the arms 14 whereupon form 28 with the belt thereon may be removed from the device. A plurality of forms 28 are subsequently nested and the belts vulcanized thereon in any desired manner. A finished belt manufactured in accordance with the above steps will be found to have substantially no tendency to stretch upon being placed in service.

Modifications of the device may be resorted to without departing from the spirit of the invention or from the scope of the appended claims.

What is claimed is:

1. Apparatus for the manufacture of non-stretchable endless belts comprising a circular series of radially movable arms for stretching an endless annular belt, means on said arms for holding a retaining form, a reciprocable cone-shaped cam for urging said arms radially outwardly to expand said belt, means for reciprocating said cam, a reciprocable head for forcing said belt in expanded condition onto said form, said cam having a circumferential flange adapted to telescope over the ends of said arms to engage the belt, and means for reciprocating said head.

2. Apparatus for the manufacture of endless belts comprising a series of radially movable members, fluid pressure operated means for urging said members radially outwardly to expand a belt placed thereupon, a reciprocable device for forcing said belt in expanded condition from said members onto a retaining form, fluid pressure operated means for reciprocating said device, and means for simultaneously actuating said fluid pressure operated means.

3. Apparatus for the manufacture of endless belts comprising a series of radially movable members, fluid pressure operated means for urging said members radially outwardly to expand a belt placed thereupon, a reciprocable device for forcing said belt in expanded condition from said members onto a retaining form, and fluid pressure operated means for reciprocating said device.

4. Apparatus for the manufacture of endless belts comprising a series of radially movable members, means for urging said members radially outwardly to expand a belt placed thereupon, a reciprocable device for forcing said belt in expanded condition from said members onto a retaining form, means for reciprocating said device, and means for simultaneously actuating all of said means.

5. Apparatus for the manufacture of endless belts comprising a series of radially movable members, means for urging said members radially outwardly to expand a belt placed thereupon, a reciprocable device for forcing said belt in expanded condition from said members onto a retaining form, and means for reciprocating said device.

6. Apparatus of the class described comprising devices for radially expanding an annular endless band, a retaining form, means on said devices for supporting the retaining form, means comprising a removable plate on each device for adapting said devices to expand bands of varying sizes and to support retaining forms of corresponding sizes, and means for forcing the band in expanded condition onto said retaining form.

7. Apparatus of the class described comprising devices for radially expanding an annular endless band, a retaining form, means on said devices for supporting the retaining form, and means for forcing said band in expanded condition onto said retaining form.

8. Apparatus of the class described comprising in combination, means for radially expanding an annular endless band and means for placing said band in expanded condition onto a retaining form.

In witness whereof I have hereunto affixed my signature this 15th day of June, 1928.

HORACE D. STEVENS.